Patented Sept. 18, 1934

1,973,787

UNITED STATES PATENT OFFICE 1,973,787

VAT DYESTUFFS OF THE BENZANTHRONE ACRIDINE SERIES AND THE PROCESS OF MAKING THEM

Hugo Wolff, Mannheim-on-the-Rhine, Germany, assignor to General Aniline Works, Inc., New York, N. Y., a corporation of Delaware No Drawing. Application June 15, 1931, Serial No. 544,691. In Germany July 8, 1930

6 Claims. (Cl. 260—36)

My present invention relates to a process for producing vat dyestuffs of the benzanthrone series, of which the simplest representative corresponds probably to the following formula

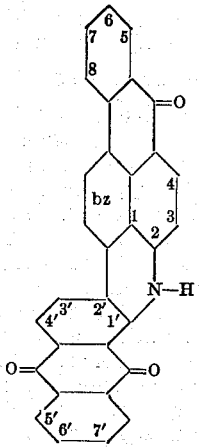

the other dyestuffs containing substituents in 6- or 7-position of the benzanthrone residue and/or in 4'-, 5'- or 6'-position of the anthraquinone residue.

Several ways have been already proposed to produce vat dyestuffs to which the ring system represented by the aforesaid formula is common.

I have now found a very simple method of producing vat dyestuffs of said class which process comprises heating equimolecular mixtures of a bz-1-nitro-2-chloro-benzanthrone compound of the general formula

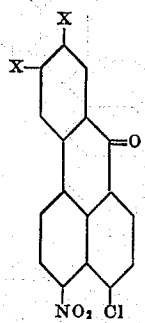

in which both X's mean hydrogen or one X hydrogen and the other halogen, and of a 1-amino-anthraquinone compound of the general formula

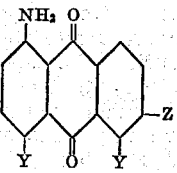

in which the Y's and Z mean hydrogen or one Y and Z hydrogen and the other Y represents an acyl-amino-group or the Y's mean hydrogen and Z an amino-group, to higher temperatures ranging from 200 to above 300° C.

The heating of the components may be advantageously carried out in the presence of correspondingly high boiling aromatic diluents, such as nitrobenzene, naphthalene, α-nitronaphthalene or benzophenone, and with the addition of an acid binding agent and a copper compound acting as catalyst.

The reaction probably occurs in such a way that the 2-benzanthronyl-1-amino-anthraquinone compound is formed and, while evolving nitrous gases, ringclosure between the bz-1-position of the benzanthrone compound and the 2-position of the amino-anthraquinone compound takes place and vat dyestuffs of the aforesaid type are obtained.

In some cases it is advantageous to isolate the 2-benzanthronyl-1-amino-anthraquinone compound as intermediate and to effect the ringclosure in a second phase. For this purpose one may carry out the heating of the components under relatively milder conditions, i. e. by interrupting the heating after a short time or by heating at temperatures not above 200° C. The ringclosure of the isolated intermediate may then be effected by heating at temperatures from 200 to above 300° C., preferably in the presence of correspondingly high boiling aromatic diluents as stated above.

The vat dyestuffs obtained according to my process in a single operation or in two phases are, when dry, blue to green to blackish powders, soluble in concentrated sulfuric acid with a bluish to violetish coloration. They dye the vegetable fiber from a bluish to violetish vat green to blue shades of good fastness.

In order to further illustrate my invention the following examples are given, the parts being by weight and all temperatures in centigrade degrees. However it is to be understood that my invention is not limited to the particular products nor reacting conditions mentioned therein.

*Example 1*

20 parts of bz-1-nitro-2-chloro-benzanthrone are mixed with 16 parts of 1-amino-anthraquinone, 6 parts of calcined sodium carbonate, 0.3 part of copper bronze and about 200 parts of α-nitro-naphthalene, and the mixture is slowly heated to boiling. While evolving nitrous gases, the coloration of the reaction mass turns into emerald green. When the intensity of this coloration is no longer increased, the reaction mass is cooled down to about 100°, about 200 parts of warm nitro-benzene are added and the precipitate is filtered off at about 80° and washed out with warm nitro-benzene, alcohol and water.

The dyestuff, thus obtained, is in the form of a crystalline greenish black powder.

Instead of copper bronze, copper oxide or other copper compounds may be used with the same result.

The dyestuff may be purified by redissolving it in concentrated sulfuric acid and precipitating it with water. When adding 10 parts of the dyestuff at room temperature to about 150 parts of concentrated sulfuric acid, the mass solidifies after a short time to a pulp of crystals of a greenish metallic lustre which may be filtered off in a suitable manner and washed out with sulfuric acid of about 64° Bé. Thus the sulfuric acid salt of the dyestuff is obtained in the form of needles of a bright metallic green lustre. By boiling it with water, the free base of the dyestuff is isolated in a very pure crystalline state. The dyestuff thus purified represents bright steel-blue needles, soluble in concentrated sulfuric acid with a blue color and dyes the vegetable fiber bright dark green shades. It corresponds probably to the formula:

*Example 2*

10 parts of bz-1-nitro-2-chloro-benzanthrone are mixed with 11.6 parts of 1-amino-4-benzoyl-amino-anthraquinone, 4 parts of calcined sodium carbonate, 0.3 part of copper bronze and about 300 parts of naphthalene and the mixture is heated, while stirring, at 210–215° for about 8–10 hours. The reaction mass is then cooled down to about 100° and diluted with about 500 parts of o-dichloro-benzene, the precipitate is filtered off at about 80° and isolated in the usual manner. The dyestuff thus obtained represents a greenish black powder soluble in concentrated sulfuric acid with a violetish brown color. It may be purified by extracting it with a suitable solvent, such as o-dichloro-benzene at 120–140°.

The dyestuff thus purified dissolves in concentrated sulfuric acid with a bluish red color and dyes the vegetable fiber from a bluish vat bright and fast olive green shades. It corresponds probably to the formula:

When replacing the 1-amino-4-benzoyl-amino-anthraquinone by 1-amino-5-benzoyl-amino-anthraquinone a similar dyestuff is obtained.

*Example 3*

5 parts of bz-1-nitro-2.6-dichloro-benzanthrone are mixed with 3.5 parts of 1.6-diamino-anthraquinone, 3 parts of calcinated sodium carbonate, 0.2 part of copper bronze and about 150 parts of nitro-benzene, and the mixture is heated for several hours at 205–210°, until the formation of the dyestuff is completed. When cool, the precipitate is filtered off and washed out with cold nitrobenzene, alcohol and water. The new dyestuff which contains chlorine represents a dark powder soluble in concentrated sulfuric acid with a violetish blue color. It dyes the vegetable fiber from a brownish violet vat grayish blue shades. It corresponds probably to the formula:

Similar dyestuffs are obtained when replacing the above used bz-1-nitro-2.6-dichloro-benzanthrone by bz-1-nitro-2.7-dichloro- or bz-1-nitro-2-chloro-benzanthrone and condensing it with 1.6-diamino-anthraquinone or another suitable diamine of the anthraquinone series.

Example 4

5 parts of bz-1-nitro-2.7-dichloro-benzanthrone are mixed with 3.3 parts of 1-amino-anthraquinone, 2 parts of calcined sodium carbonate, 0.1 part of copper bronze and about 100 parts of α-nitronaphthalene, and the mixture is heated to boiling for a short time. When working up the reaction mass as described in the foregoing examples, the dyestuff is obtained in the form of a greenish black powder which may be purified by extracting it with a suitable solvent such as dichlorobenzene or nitrobenzene at 120–140°. The purified dyestuff containing chlorine dissolves in concentrated sulfuric acid with a violetish blue color and dyes the vegetable fiber from a violetish blue vat grayish green shades. It corresponds probably to the formula:

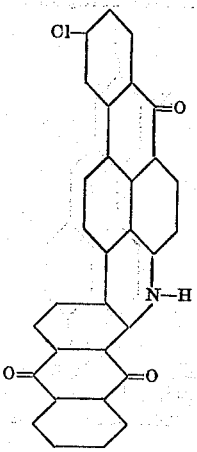

A similar dyestuff is obtained by condensing bz-1-nitro-2.6-dichloro-benzanthrone with 1-amino-anthraquinone.

Example 5

The condensation of bz-1-nitro-2-chloro-benzanthrone with 1-amino-anthraquinone is carried out for a short time with the addition of nitrobenzene at about 200–210° and 1 part of 2-(bz-1-nitro - benzanthronyl) - 1'- amino-anthraquinone thus formed is heated for several hours to boiling with about 150 parts of nitrobenzene. The dyestuff separates already during the heating in the form of little crystals which are filtered off after cooling down the reaction mass to about 100° and washed out with warm nitrobenzene and alcohol.

The new dyestuff thus obtained in the form of bright steel-blue needles is identical with the dyestuff of Example 1.

Instead of nitrobenzene, other suitable aromatic compounds, such as nitro-naphthalene, naphthalene, benzophenone may be used as solvents.

Example 6

3 parts of 2-(bz-1-nitro-benzanthronyl)-1'-amino-anthraquinone, obtained as described in Example 5, are heated at 300–330° in a suitable apparatus for some time. While evolving nitrous gases, the originally reddish brown condensation product turns into greenish black. By dissolving it in concentrated sulfuric acid and precipitating it with water, it may be brought into the form of a paste. It is identical with the dyestuff of Example 1.

Example 7

Bz-1-nitro-2.7-dichloro-benzanthrone is condensed under mild conditions with one molecular proportion of 1-amino-anthraquinone and 1 part of 2 -(bz-1-nitro-7-chloro - benzanthronyl) - 1'-amino-anthraquinone thus formed and isolated in the usual manner is poured into 80 parts of 2-nitro-1.4-dichloro-benzene at about 100° and the mixture is heated to boiling for about 1 hour. The originally red coloration of the solution slowly turns from brownish olive into an intense green. The reaction mass is cooled down to about 100° and then diluted with about 80 parts of nitrobenzene and the precipitate is filtered off at about 50° and isolated in the usual manner. The dyestuff thus obtained with a good yield is identical with the dyestuff of Example 4.

A similar dyestuff is obtained by heating the 2-(bz-1-nitro-6-chloro-benzanthronyl)-1-amino-anthraquinone to higher temperatures.

Example 8

Into 100 parts of molten α-nitro-naphthalene at about 100° 5 parts of the condensation product obtained by condensing under mild conditions equimolecular proportions of bz-1-nitro-2-chloro-benzanthrone and of 1.6-diamino-anthraquinone are added and the mixture is heated to boiling. The originally reddish brown coloration of the reaction mass slowly turns into an intense emerald green. When the intensity of this green coloration is no longer increased, the reaction is completed. After cooling down the reaction mass to about 100° it is diluted with the same quantity of cold nitrobenzene and the precipitate is filtered off at about 60° and washed out with nitrobenzene and alcohol. In this manner the new dyestuff is obtained as a black powder soluble in concentrated sulfuric acid with a blue color. When pouring this solution into an aqueous solution of sulfuric acid, a grayish blue paste is obtained. From a blue vat the vegetable fiber is dyed grayish blue shades. The new dyestuff corresponds probably to the formula:

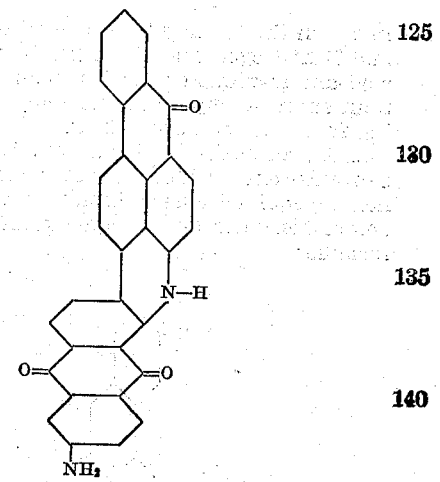

Similar dyestuffs are obtained when heating to higher temperatures condensation products obtained by condensing under mild conditions bz-1-nitro-2-chloro-benzanthrone or bz-1-nitro-2.6- or -2.7-dichloro-benzanthrone with another suitable diamino-anthraquinone.

Example 9

To 500 parts of molten naphthalene at about 100° 10 parts of 2-(bz-1-nitro-benzanthronyl)-1'-amino-4'-benzoyl-amino-anthraquinone, obtained by condensing under mild conditions equimolecular proportions of bz-1-nitro-2-chlorobenzanthrone and of 1-amino-4-benzoyl-amino-anthraquinone, are added and the mixture is heated to boiling for several hours. When the formation of the dyestuff is completed, the reaction mass is cooled down to about 100° and diluted with 500 parts of warm o-dichlorobenzene. The precipitate is filtered off at about 80° and washed out with warm o-dichlorobenzene until the filtrate is only slightly greenish colored. The dyestuff is identical with the dyestuff of Example 2.

I claim:

1. A process for producing vat dyestuffs of the benzanthrone-acridine series which comprises heating equimolecular mixtures of a bz-1-nitro-2-chloro-benzanthrone compound of the general formula:

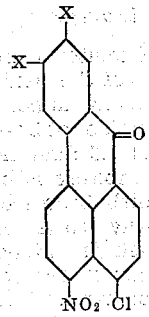

in which both X's mean hydrogen or one X hydrogen and the other halogen, and of a 1-amino-anthraquinone compound of the general formula:

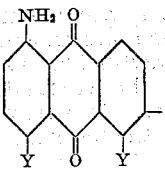

in which the Y's and Z mean hydrogen or one Y and Z hydrogen and the other Y represents an acyl-amino-group or the Y's mean hydrogen and Z an amino-group, to higher temperatures ranging from 200 to above 300° C.

2. A process for producing vat dyestuffs of the benzanthrone-acridine series which comprises heating equimolecular mixtures of a bz-1-nitro-2-chloro-benzanthrone compound of the general formula:

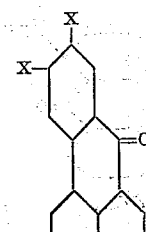

in which both X's mean hydrogen or one X hydrogen and the other halogen, and of a 1-amino-anthraquinone compound of the general formula:

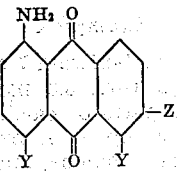

in which the Y's and Z mean hydrogen or one Y and Z hydrogen and the other Y represents an acyl-amino-group or the Y's mean hydrogen and Z an amino-group, to higher temperatures ranging from 200 to above 300° C. in the presence of inert high boiling aromatic diluents and with the addition of an acid binding agent and a copper compound acting as condensation catalyst.

3. A process for producing vat dyestuffs of the benzanthrone-acridine series which comprises heating equimolecular mixtures of a bz-1-nitro-2-chlorobenzanthrone compound of the general formula:

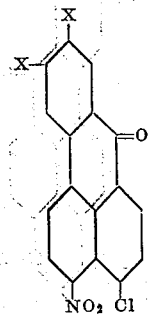

in which both X's mean hydrogen or one X hydrogen and the other halogen, and of a 1-amino-anthraquinone compound of the general formula:

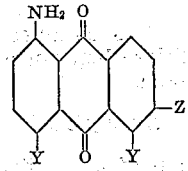

in which the Y's and Z mean hydrogen or one Y and Z hydrogen and the other Y represents an acyl-amino-group or the Y's mean hydrogen and Z an amino-group, to higher temperatures ranging from 200 to above 300° C. with interrupting the heating in order to isolate the corresponding bz-1-nitro-benzanthronyl-1'-amino-anthraquinone compounds as intermediates and continuing by heating the isolated intermediates at temperatures from 200 to above 300° C.

4. A process for producing vat dyestuffs of the benzanthrone-acridine series which comprises heating equimolecular mixtures of a bz-1-nitro-2-chloro-benzanthrone compound of the general formula:

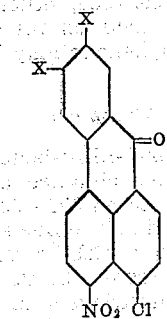

in which both X's mean hydrogen or one X hydrogen and the other halogen, and of a 1-aminoanthraquinone compound of the general formula:

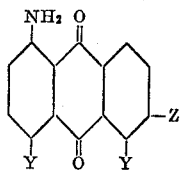

in which the Y's and Z mean hydrogen or one Y and Z hydrogen and the other Y represents an acyl-amino-group or the Y's mean hydrogen and Z an amino-group, to higher temperatures ranging from 200 to above 300° C. in the presence of inert high boiling aromatic diluents and with the addition of an acid binding agent and a copper compound acting as condensation catalyst with interrupting the heating in order to isolate the corresponding bz-1-nitro-benzanthronyl-1'-amino-anthraquinone compounds as intermediates and continuing by heating the isolated intermediates at temperatures from 200 to above 300° C. with the addition of an inert high boiling aromatic diluent.

5. As new compounds vat dyestuffs of the benzanthrone-acridine series corresponding to the general formula:

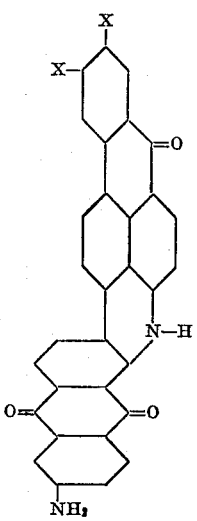

wherein both X's mean hydrogen or one X halogen and the other hydrogen, which dyestuffs are when dry blackish powders, soluble in concentrated sulfuric acid with a bluish color, and dyeing the vegetable fiber from a blue to violet vat grayish blue shades of a good fastness.

6. As a new compound the vat dyestuff of the benzanthrone-acridine series corresponding to the formula:

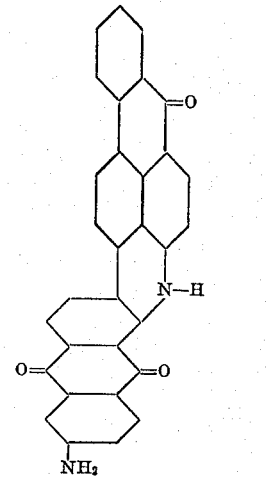

which dyestuff is when dry a blackish powder soluble in concentrated sulfuric acid with a blue color, and dyeing the vegetable fiber from a blue vat grayish blue shades of a good fastness.

HUGO WOLFF.